United States Patent

Wing et al.

[15] 3,698,747
[45] Oct. 17, 1972

[54] THREADLESS CONNECTOR

[72] Inventors: Wilson Gordon Wing, P.O. Box 22283, Houston, Tex. 77021; John Bellis Miller, III, 3402 South Shaver, #7, South Houston, Tex. 77587

[22] Filed: April 5, 1971

[21] Appl. No.: 130,936

[52] U.S. Cl..............285/305, 285/401, 287/103 A
[51] Int. Cl..............................................F16l 37/24
[58] Field of Search......285/305, 321, 317, 360, 401, 285/376; 287/103 A, 53 TK

[56] References Cited

UNITED STATES PATENTS

| 3,149,362 | 9/1964 | Smithson | 285/305 X |
| 1,543,356 | 6/1925 | Arnold | 285/321 X |
| 3,428,340 | 2/1969 | Pelton | 285/321 X |
| 3,314,696 | 4/1967 | Ferguson et al. | 285/305 X |

FOREIGN PATENTS OR APPLICATIONS

| 180,439 | 3/1966 | U.S.S.R. | 285/321 |
| 1,140,634 | 3/1957 | France | 285/305 |
| 1,396,434 | 3/1965 | France | 285/305 |

Primary Examiner—Thomas F. Callaghan
Attorney—Bernard A. Reiter

[57] ABSTRACT

An improved connector for affixing in removable manner a choke or compensator-like device to the end of a gun barrel. The connector comprises a connector ring which is adapted to be fixedly attached to the end of the barrel and which receives thereover a connector clip which is in turn affixed to the choke or compensator device. The clip and connector ring co-act with one another through a plurality of flat surfaces on the latter so that a simple rotative twist of the choke produces a snapping engagement of clip arms in certain of the ring flats. Removal of the choke is accomplished by rotation thereof so that the clip arms are caused to move out of engagement with the certain ring flats and hence out of engagement with the ring and the barrel to which it is connected.

6 Claims, 7 Drawing Figures

PATENTED OCT 17 1972
3,698,747
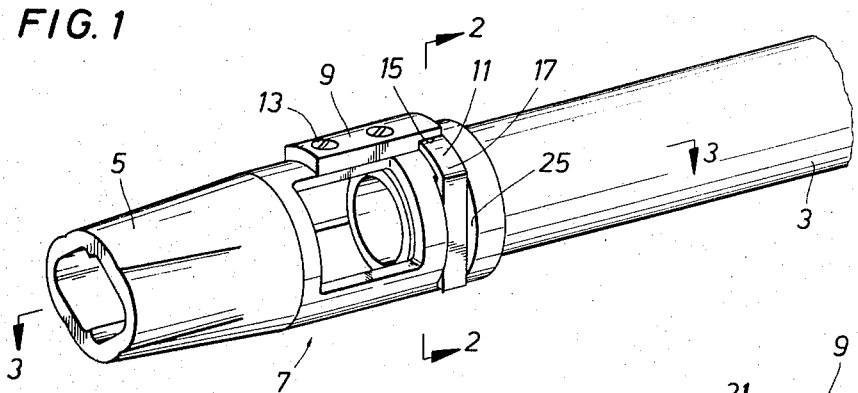
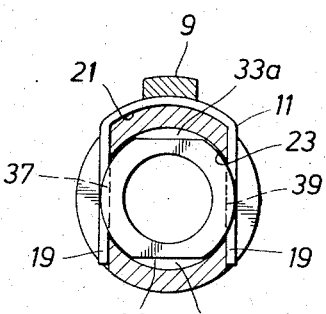
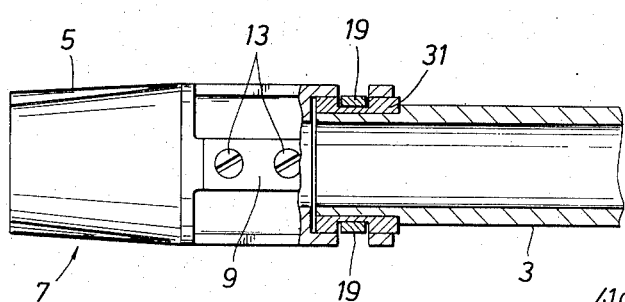
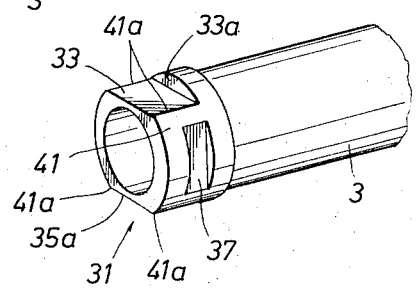
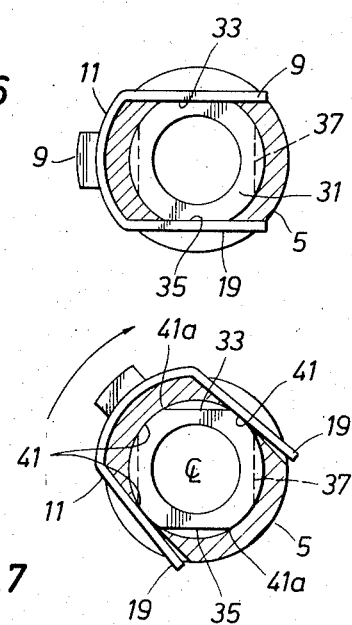
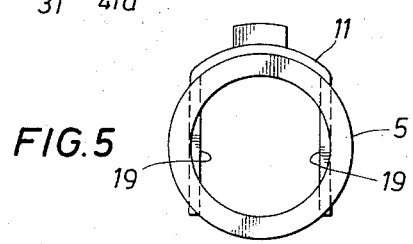
Wilson Gordon Wing
John Bellis Miller, III
INVENTORS
BY Bernard A. Reiter
ATTORNEY 3,698,747

THREADLESS CONNECTOR

BACKGROUND OF THE INVENTION

This invention pertains to connectors and more particularly threadless connectors of the type which may be used to telescopically affix one body, such as a gun barrel, to another body, such as a choke or other shot modifying means.

The use of chokes, silencers, grenade attachments, and other shot or character modifying devices to guns is commonly known in the ballistics and weaponry arts. The means used to attach the devices to gun barrels are generally of permanent nature, such as by welding or brazing or by circumferentially arranged screws and locking threaded connections. Connections such as brazing or welding are prone to fracturing during the explosive reaction and as a result there is presented a significant risk of injury to the user and to bystanders. Screws and the like are, after continued use, prone to shear because of the stresses thereon. Also the necessity to insert the screws into the gun barrel itself is undesirable for reasons of time. Additionally, threaded connections between the choke and the barrel are not altogether satisfactory because of the threading operations necessary and because of the pre-existing possibility that the choke may unthread itself from the barrel.

BRIEF DESCRIPTION OF THE INVENTION

In an effort to obviate the aforementioned disadvantages, the present invention, briefly, proposes a threadless connector in which a connector ring having a plurality of external surfaces thereon is affixed to the barrel of a shotgun. The connection itself is generally permanent although the choke which is adapted to seat thereon may be easily removed. The choke is characterized at one end thereof by a pair of radially expandable arms which are adapted to telescopically slide over cooperating surfaces on the connector ring. When the arms have slid an appropriate distance, a quarter twist is given to the choke while holding the gun barrel stationary and the arms snap into position in cooperating channel flats on the connector ring. The choke cannot be removed longitudinally without applying first a rotative force. Sufficient rotative force can only be applied by forceably twisting the choke off the channel flats. In this way the choke or the shot modifying means obviously cannot work itself off the barrel during operation; yet at the same time it is easily removable without the utilization of any tools whatever. The threadless connector herein is relatively inexpensive to manufacture and provides for simplified and expedient attachment and removal of substantially any type of shot or characteristic modifying means. Numerous features in addition to those briefly explained hereinabove will become more readily apparent upon a reading of the following detailed description, claims and drawings, wherein like numerals denote like parts in the several views and wherein:

BRIEF DESCRIPTION OF DRAWINGS

FIG. 1 is a perspective assembly of the choke, barrel and threadless connector affixing the former to the latter.

FIG. 2 is a front view showing the arms of the threadless connector in attached position to the barrel.

FIG. 3 is a longitudinal section view along the plane 3—3 of FIG. 1.

FIG. 4 is a perspective view showing the surface locations of the connector ring as same is disposed at the end of the barrel.

FIG. 5 is an end view showing the position of the choke and attached connector showing the assembly rotated to a removable position from the barrel.

FIG. 6 is a front view showing the choke and connector in another position removable from the barrel.

FIG. 7 shows the choke and connector in an intermediate rotative position moving from the unattached sliding position on the surface flats to the attached fixed position in the channel flats.

DETAILED DESCRIPTION

With reference now to the drawings there is shown the barrel 3, attachment or modifying means 5 and connector 7. The connector 7 essentially comprises a clip retainer 9 the function of which is to affix connector clip 11 in fixed relation to the shot modifying means 5. The clip retainer 9 is affixed to the modifying means by screws 13 or the like. The clip retainer is characterized by a recessed shelf 15 at one end thereof and which is adapted to abut against the upper surface 17 of connector clip 11, thereby precluding outward radial movement with respect to the longitudinal axis of barrel 3.

The connector clip 11 acts simply as a stop means and is provided with a pair of parallel arms 19 extending from base wall 21 that communicates between the end of each arm. The arms 19 are relatively rigid in themselves but are adapted to be expanded by the application of appropriate force, see FIG. 7. In a normal unstressed position, however, the arms reside as shown in FIG. 2.

The arms 19 of connector clip 11 normally reside in apertures or cut-outs 15 disposed in the sides of shot modifying means 5. The apertures 15 extend through the walls of the shot modifying means so as to normally reside slightly interiorly of the bore 23 of the shot modifying means, see FIG. 2 for example. It may thus be visualized that the shot modifying means 5, when assembled with connector clip 11 by means of screws 13 extending through clip retainer 9, provides for arms 19 in apertures 25. The base wall 21 of clip 11 cannot move outwardly radially by reason of the clip retainer 9. The walls of apertures 25 preclude movement of arms 19 in either longitudinal direction and thus it is seen that such arms can move only outwardly and away from one another.

Attention may now be directed to FIGS. 3 and 4 wherein there is shown the connector ring or mounting means onto which the shot modifying means 5 is attached through the aforesaid connector clip 11. The connector ring 31 consists of a tubular-like body having an internal dimension which is adapted to fit over the external dimension of its cooperating body, or in the present instance the barrel 3. The ring is characterized by surface flats 33, 35 which, for exemplary purposes, are shown to be two in number and which further are disposed in diametrically opposing positions. The surface flats are of appropriate distance from one another so as to slidably receive thereover the arms 19 when the connector ring and barrel are telescopically inserted into the end of choke 5, see FIG. 1. Thus the arms rest upon and are longitudinally movable over the surface flats 33, 35. It will be apparent that the surface flats therefore serve first to orient the means 5 with respect to the barrel 3 and then to position the means 5 with respect to the next step of actually affixing the means 5 to the barrel 3. The positioning function is produced by surface flat walls 33a, 35a, each of which are disposed in normal relation to flats 33, 35 so that arms 19 are adapted to abut thereagainst when choke 5 is slid over the barrel 3. After clip arms 19 are moved into abutting relationship with the walls 33a, 35a, the choke or modifying means 5 is ready for connection to barrel 3. This is accomplished by applying a slight manual rotative twist on one body with respect to the other. In the exemplary form of the invention shown, it is seen, for example, most clearly in FIG. 4 that channel flats 37, 39 (channel flat 39 being shown in FIG. 2) are disposed at substantially 90° positions with respect to surface flats 33, 35. The channel flats 37, 39 are of sufficient depth so as to clearly receive therein the arms 19 upon counterrotation of the two bodies with respect to each other. During the rotative process preparatory to connection, the arms 19 are abnormally expanded outwardly (see FIG. 7) with respect to the central longitudinal axis, this being produced by the intersection of radial surfaces 41 with surface flats 33. Such intersections are generally defined as at 41a. Once the arms 19 are rotated over the maximum radial edge defined at 41a, they immediately move into engagement with channel flats 37, 39. Due to the abutting engagement of the walls of channel flats 37, 39 with arms 19 of the clip 11, the choke or other modifying means cannot move in either longitudinal direction. Since the inherent position of the arms is again reached when they are disposed in the channel flats 37, 39 a very pronounced rotative action is necessarily applied to the choke 5 in order to rotate it off of the channel flats. Thus the choke is fixedly attached to the barrel and may not be removed except by intentional and pronounced application of a rotative force in either direction exerted on one of the bodies with respect to the other, that is relative rotation of barrel 3 and means 5 with respect to one another.

In summary it is thus readily visualized that application of the choke is accomplished merely by orienting the arms 19 of the connector clip 11 so that they may slide onto surface flats 33, 35. Slight rotation of the choke with respect to the barrel then causes the arms 19 to expand until they pass over intersections 41a and snap into engagement with channel flats 37, 39. Surface flat walls 33a, 35a serve to align the arms 19 with channel flats 37, 39 so that the entire attachment may be accomplished without visually surveying either the choke or the barrel. Accomplishment of the connection is easily acknowledged by the resistance to further turning of the choke. It will be readily recognized that numerous modifications to the preferred embodiment set forth may be made without departing from the spirit of the invention. For example, the surface flats 33, 35 need not be diametrically opposed to one another and need not be two in number in order to accomplish the functions set forth herein. Likewise channel flats 37, 39 need not be so disposed or provided in the numbers shown in order to provide locking means for the two bodies. Other modifications are contemplated without departing from the scope of the claims appended hereto.

That which is claimed and desired to be secured by United States Letters Patent is:

1. In a coupling means for releasably connecting a first body to a second body by the application of a rotative force on one body with respect to the other comprising
    a connector ring means adapted for attachment to the first body and which is characterized by a plurality of respective flat areas thereon for first aligning with and then receivably engaging coupler arms which are adapted for attachment to the second body.
    said respective flat areas including guide flats for directing the arms toward engaging flats located adjacent the guide flats, and engaging flats circumferentially aligned with said guide flats for coupling the arms to the connector ring when the arms are moved thereto, and,
    a retainer clip means fixedly attached to a second body and which is characterized by a plurality of arms integrally connected thereto for selectively engaging first the guide flats of the connector ring means, and then upon relative rotation of the retainer clip means and the arms, the engaging flats, so as to thereby couple the connector ring means to the retainer clip.

2. The coupling means of claim 1 wherein said guide flats are disposed on the surface of the connector ring means and are characterized by an end wall means for limiting movement of the arms,
    said engaging flats being properly aligned with said end wall means of said guide flats so that the wall means inherently position the arms preparatory to their rotation into the engaging flats.

3. The coupling means of claim 2 wherein said guide flats and engaging flats are intermittently, alternately positioned about the surface thereof.

4 The coupling means of claim 3 wherein the flat areas are disposed in cooperating opposing pairs with the guide flats located opposite one another about the coupling means surface and the engaging flats located opposite one another about the coupling means surface.

5. The coupling means of claim 4 wherein retainer clip arms extend flexibly from a common base and are so formed in their normal unstressed position as to slidingly engage at least a pair of said guide flats.

6. The coupling means of claim 5 wherein opposing surface areas on the connector ring which are intermediate the flat areas are farther from one another than are opposing flat areas so that rotative movement of said retainer clip produces distended flexing of the arms over said opposing surface areas, the relative distance of said opposing engaging flats from one another being substantially the same as said opposing guide flats from one another so that the arms are in a normal unstressed state when locked in the engaging flats.

* * * * *